Jan. 8, 1935.     J. W. LIVINGSTON     1,987,301
PURIFICATION BY SUBLIMATION
Filed Dec. 8, 1933
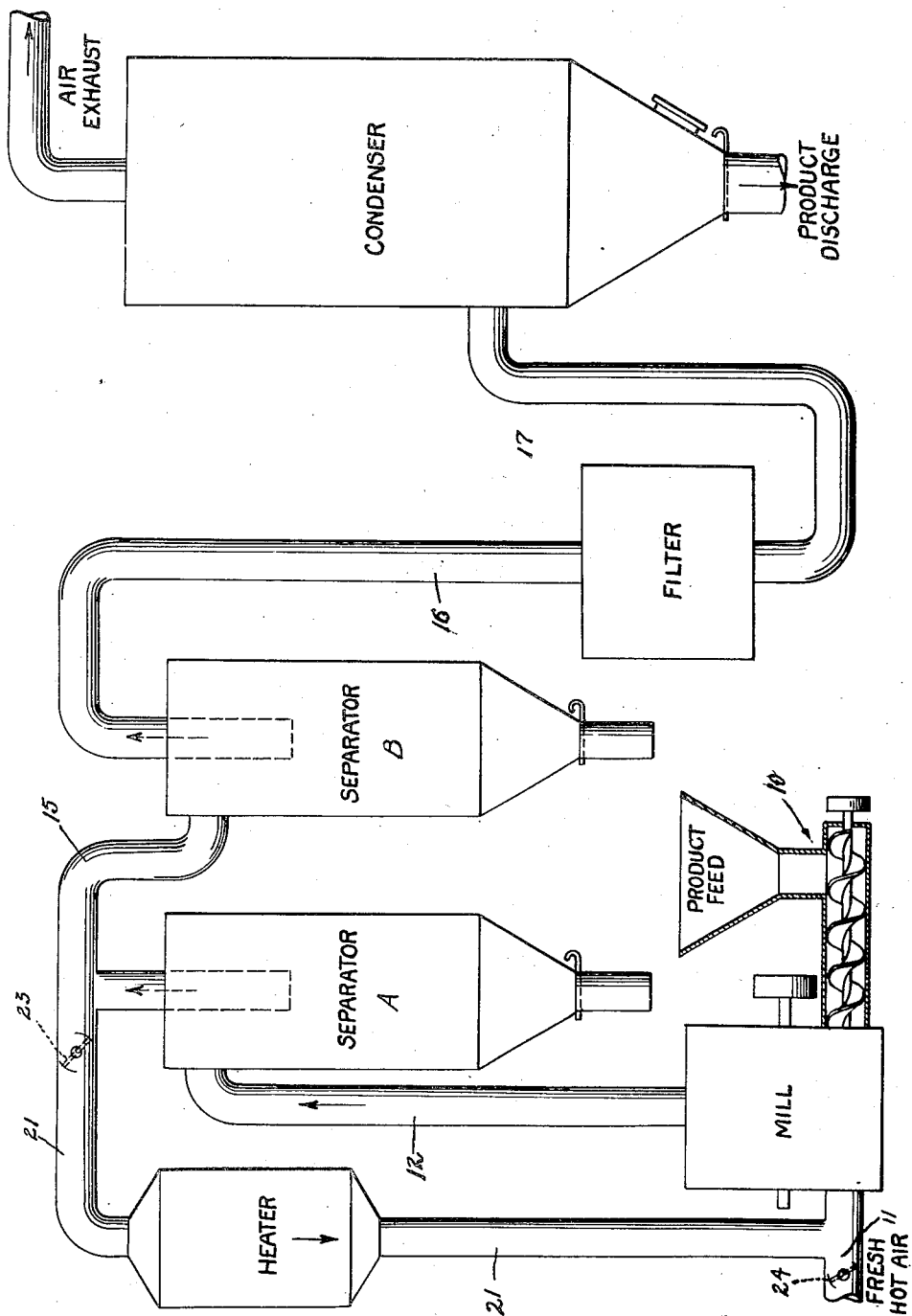
INVENTOR;
JOHN W. LIVINGSTON
BY
ATTORNEY Patented Jan. 8, 1935

1,987,301

UNITED STATES PATENT OFFICE 1,987,301

PURIFICATION BY SUBLIMATION

John W. Livingston, Kirkwood, Mo., assignor to Monsanto Chemical Company, St. Louis, Mo., a corporation of Delaware Application December 8, 1933, Serial No. 701,480

10 Claims. (Cl. 260—111)

This invention relates to the purification of normally solid volatilizable organic substances and it has particular application to a method wherein purification of products such as salicylic acid is effected by sublimation.

Various methods of subliming products such as benzoic acid, phthalic anhydride, etc. have been proposed. In general, however, the methods of effecting purification of substances such as benzoic acid and phthalic anhydride are not adaptable to salicylic acid for the reason that the temperature which is necessary in order to attain volatilization of salicylic acid is within its decomposition temperature range. Moreover, the presence of most metals, salts and the like, accelerate the decomposition. This is illustrated by the fact that salicylic acid suffers decomposition at a temperature even as low as its fluxing temperature particularly in the presence of impurities and metals. On the other hand, benzoic acid as well as phthalic anhydride are stable at their fluxing temperatures and do not suffer from decomposition even at relatively higher temperatures.

It has been proposed heretofore to effect sublimation of salicylic acid by passing heated air, for example, over solid salicylic acid, the temperature of the air being maintained below the fluxing temperature of the acid but sufficiently high to sublime the same. This process is operative but is objectionable for the reason that very large quantities of air are necessary since the degree of saturation obtainable under the conditions of such process is relatively low. Moreover, the equipment necessary for purifying the product is of huge dimensions. In order to increase the degree of saturation it has been proposed to blow the air directly through a mass of solid salicylic acid thereby obtaining more intimate contact. Although this procedure is fairly effective in the early stages, in time the air channels through the mass and toward the end of the operation the degree of saturation is extremely low.

In both of these procedures the air may be recirculated but it soon becomes laden with impurities and it is necessary to supply fresh air and scrub the exhausted air carefully to remove any salicylic acid which it may contain. In both of these processes the danger of contamination by unsublimed salicylic acid dust is real.

It has also been proposed to purify salicylic acid by blowing air through molten acid. This procedure has the advantage of reducing dust contamination and producing a higher degree of saturation since one operates at a higher temperature and obtains a more intimate contact between the air and the liquid salicylic acid but suffers the disadvantage of decomposition and consequent loss in yield.

All of these processes suffer a common objection, namely, they are of a batch type which necessitates a periodic shutdown to remove the accumulated tars and residues that form and that are rich in salicylic acid. Moreover, under batch operating conditions the quality of the product varies as the impurities accumulate in the system. The conditions of operation during a cycle of operations are not uniform.

One object of my invention is to provide a method of sublimation which is characterized by the fact that the material undergoing treatment is subjected to the elevated temperatures of the purification for only a very short period of time, the raw material is supplied continuously and the product as well as impurities are recovered individually and removed from the system continuously.

A further object of the invention is to provide a continuous, uniform method of purification by sublimation which avoids the necessity of fluxing the crude material preliminary to its volatilization.

The invention likewise contemplates a method of effecting practically instantaneous and continuous sublimation under conditions which avoid to a large extent long contact with relatively hot metallic surfaces and which at the same time enables one to attain a high degree of saturation. The invention contemplates specifically a method of purifying organic substances which are relatively unstable and which suffer decomposition when exposed for a substantial period of time to the elevated temperature conditions necessary in present day methods.

According to the present invention solid salicylic acid is added continuously to a pulverizing mill to which there is added continuously a supply of hot air, carbon dioxide or flue gas. A dust cloud of salicylic acid is thus produced which is almost immediately volatilized under the influence of the intimate contact with the hot subliming medium which is provided in the pulverizing mill as well as the extreme subdivision of the solid salicylic acid particles which is made possible by the mill. The discharge from the mill is passed through a separator to remove any salicylic acid which may not have sublimed as well as non-volatile impurities associated with the crude salicylic acid after which the gases from the separator are passed through a filter and finally into a condenser where the salicylic acid is precipitated from the gas stream.

A better understanding of my invention may be had by referring to the accompanying drawing which illustrates an embodiment of my invention which may be preferred. The drawing is a more or less diagrammatic elevational view of an apparatus train which may be employed in practicing one embodiment of my invention.

The apparatus consists of a pulverizing mill into which the product is fed by means of a screw conveyor 10 which preferably is jacketed in order to preheat the product, care being exercised to avoid fluxing. Fresh hot air is likewise supplied to the mill through pipe 11 which is brought into intimate contact with the pulverulent material. The discharge from the mill flows through a duct 12 into a separator "A" of the cyclone type wherein most of the solid material is thrown out of suspension and withdrawn from the base. The solid which is recovered from separator "A" is collected and after a sufficient quantity has accumulated is passed again through the mill to recover any salicylic acid which it contains. Alternatively, a part of the solid may be returned continuously to the mill through the screw feed mechanism 10.

The gas discharged from separator "A" flows through duct 15 into separator "B" which functions to afford more complete removal of suspended matter and thereby to reduce the load on the subsequent filter which is connected on the discharge side of the separator "B" through duct 16. The filtered gas flows to a condenser through duct 17 wherein it is cooled sufficiently to condense the product. The condensed solid product is removed manually or mechanically from the condenser either continuously or periodically. The cooled air which is exhausted from the condenser may be returned in part to the mill after being preheated or may be discharged into the atmosphere after having been treated to remove any acid which remains as is well understood by those skilled in the art.

If desired and with the view of increasing the saturation of the gas which is supplied to the condenser without the necessity of utilizing an initial air of especially high temperature, a part of the gas discharged from separator "A" may be returned through duct 21 to the mill after having passed through a heater which raises the temperature of the gas sufficiently to insure its capacity to volatilize additional salicylic acid.

The mill may be of any standard pulverizing type which includes rapidly rotating parts for effecting intimate mixture of the finely divided salicylic acid and air. Its construction may advantageously be of the roller or hammer mill type which is well suited due to the fact that it is equipped with a fan to propel the cloud produced; one may, however, employ a fan in conjunction with a pulverizing mill that is not equipped to discharge a suspension from the mill. Machinery of this general type is frequently employed in metallurgical and coal grinding operations. The mills are generally equipped to suck air into the milling chamber and discharge the same together with the solid material which is supplied thereto. While roller or hammer mills are especially suited, other grinding equipment which embodies a fan or may be equipped to operate in a current of air may be employed. Alternatively, the salicylic acid may first be pulverized and subsequently fed to a fan or blower to produce the cloud.

Obviously, in ordinary grinding and pulverizing operations the phenomenon of sublimation does not occur; on the contrary, the cloud of pulverulent material is discharged directly into a separator wherein the solid material fed to the mill is recovered almost quantitatively.

In order to attain a higher degree of saturation and otherwise preserve the heat supplied by the air it is advantageous to preheat the salicylic acid by jacketing the screw conveyor. For this purpose the salicylic acid may be preheated safely to 130°–135° C. without causing appreciable decomposition.

The separators are of any desired design well known to those skilled in the art and may advantageously be of the so-called cyclone type. The filter is likewise of standard construction; its filter element being determined to a large extent by the material which is being put through the mill and the temperature at which the system is maintained. In the case of benzoic and salicylic acids one may employ mineral wool, asbestos, sand, or granular fuller's earth, etc. or a combination of two or more of these. Inasmuch as the gas which reaches the filter has already passed through two separators, the load on the filter is not great. However, for obvious reasons, it is desirable that the filter should be of such construction as to enable one to change the pervious membrane or layer from time to time. For this purpose one may employ two filters in parallel either of which may be operated independently of the other.

The heater may be of a fire tube boiler design in which the heating medium surrounds the tubes. Alternatively, the heater may consist of a single jacketed pipe.

The fresh air may be heated by means of high pressure steam or in any other way which will afford an even, controllable temperature. The equipment should be lagged carefully in order to avoid condensation in the system. To this end one may jacket (or surround with coils) the various parts to supply heat which is lost to the surrounding atmosphere. This is particularly desirable if the equipment is operated under conditions which afford substantial saturation of the vapor discharged from the mill.

Although the conditions of operation may be varied for different substances, in the case of dry salicylic acid the solid product is fed to the mill at approximately 100° C.–135° C., where it is mixed with air, the temperature and volume of which is adjusted with respect to the rate of salicylic acid feed so as to maintain a mill discharge temperature of 140° C.–175° C. The heater unit by which part of the air in duct 12 is recirculated through the mill is employed conveniently if it appears that the degree of saturation or amount of salicylic acid volatilized drops due to unfavorable operating conditions or irregularities of operation, including reduced temperature of the fresh air. The valves 23 and 24, which are mounted in ducts 21 and 11 respectively, are employed to adjust the ratio of returned air with respect to the fresh hot air to obtain the temperature conditions desired for any specific substance.

The mode of volatilization which I employ not only affords substantially instantaneous vaporization whereby a high degree of saturation is realized, but the volatilization is effected under conditions which avoid long contact with any surface through which heat for vaporization is supplied. This condition is of importance since it obviates the danger of coating a hot surface with fluxed salicylic acid that would otherwise cake, decompose and form an insulating layer against heat transfer.

Moreover, the process is continuous and the materials introduced into the system are rushed through rapidly; this is true of the salicylic acid as well as the relatively non-volatile impurities associated with it in the crude product. The rate of operation is uniform; the degree of saturation is independent of the amount of product already sublimed and is readily controllable. Finally, the non-volatile residue obtained is dry; it is not a tar of sticky consistency; it contains only a very few per cent of salicylic acid but is very rich in dicarboxylic phenols which are known to be by-products of the Kolbe synthesis but which heretofore have never been recoverable due to the deficiencies of present day refining methods.

Although I have described my invention as applied to the sublimation of salicylic acid and have illustrated and described an apparatus which is adapted for effecting sublimation of salicylic acid, as well as other volatilizable organic substances, it should be understood that the invention is not limited to the specific embodiment illustrated but contemplates broadly the sublimation from a solid state of volatilizable organic compounds while maintaining an intimate, uniform suspension of the finely divided material in the subliming medium.

What I claim is:

1. A method of sublimation characterized in that the material to be sublimed is subjected to a process of pulverizing in solid form and simultaneously a hot subliming medium is added whereby the pulverulent material is volatilized while suspended and in a finely divided form, removing the material from the zone of pulverization and separating the impurities.

2. A method of sublimation characterized in that the material to be sublimed is subjected to a process of pulverizing in solid form and simultaneously a hot subliming medium is added whereby the pulverulent material is volatilized while suspended and in a finely divided form, separating the non-volatile material from the resulting suspension, the separation of non-volatile material being effected after the material has passed from the zone of pulverization, and finally cooling the gaseous product.

3. The method as defined in claim 2 and further characterized in that the suspension discharged after pulverizing is subjected to a preliminary separating operation for the non-volatilized substances by subjecting the same to a centrifugal separating operation, subsequently filtering the resultant gas medium, the separation and filtration of non-volatile material being effected beyond the zone of sublimation, and finally recovering the sublimed material by cooling the filtered gas.

4. The method of subliming salicylic acid characterized in that salicylic acid in solid form is subjected to a process of pulverizing and simultaneously a hot subliming medium is added whereby the pulverized salicylic acid is volatilized while suspended in a finely divided form, subsequently separating the non-volatile suspended matter from the gas medium, the separation of non-volatile material being effected after removal of the material from the zone of pulverization, and finally recovering the salicylic acid by cooling the gas.

5. The method of subliming salicylic acid characterized in that the salicylic acid is subjected to a process of pulverizing by hammering and simultaneously there is also added a hot subliming medium whereby the salicylic acid is volatilized while suspended and in finely divided form, removing the non-volatile suspended matter from the subliming medium, the removal being effected beyond the zone of sublimation and finally recovering the product by cooling the medium.

6. The method as defined in claim 1 and further characterized in that hot flue gas is employed as the subliming medium.

7. The method as defined in claim 1 and further characterized in that preheated air is employed as the subliming medium.

8. A method of purification of salicylic acid by sublimation characterized in that pulverulent salicylic acid is suspended under violently agitated conditions in a hot subliming medium under conditions whereby the salicylic acid passes directly from a solid to a vapor state, conducting all the pulverized material away from the zone of agitation, separating the non-volatile suspended matter and finally recovering the product by condensation.

9. A method of sublimation characterized in the fact that the material to be sublimed is subjected to a process of pulverization and simultaneously is blown with a hot gaseous medium to remove the pulverulent material and impurities as a cloud-like suspension from the zone of pulverization and simultaneously to effect sublimation of the material and after removal of the material from the zone of pulverization, removing the solid impurities from the gaseous phase.

10. The method of subliming salicylic acid characterized in that the salicylic acid is subjected to a process of pulverization by rolling and simultaneously there is added a hot subliming medium whereby the salicylic acid is volatilized while suspended and in finely divided form, removing the non-volatile suspended matter from the subliming medium, and finally recovering the product by cooling the medium.

JOHN W. LIVINGSTON.